Jan. 28, 1936.　　　A. E. MILLER ET AL　　2,028,988
CONTROL MECHANISM FOR CONCRETE MIXERS AND ANALOGOUS APPARATUS
Filed Oct. 30, 1931　　　4 Sheets-Sheet 3

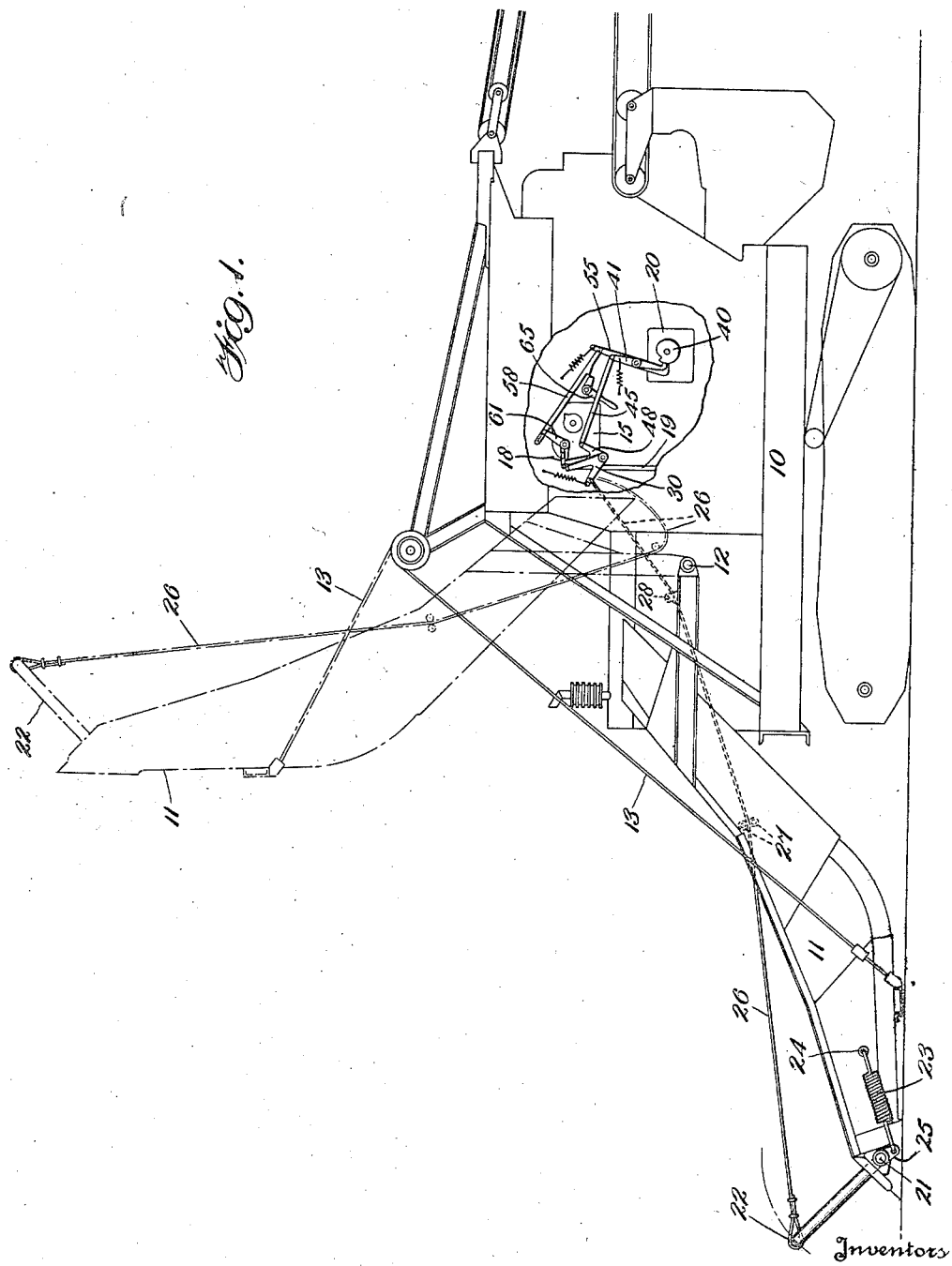

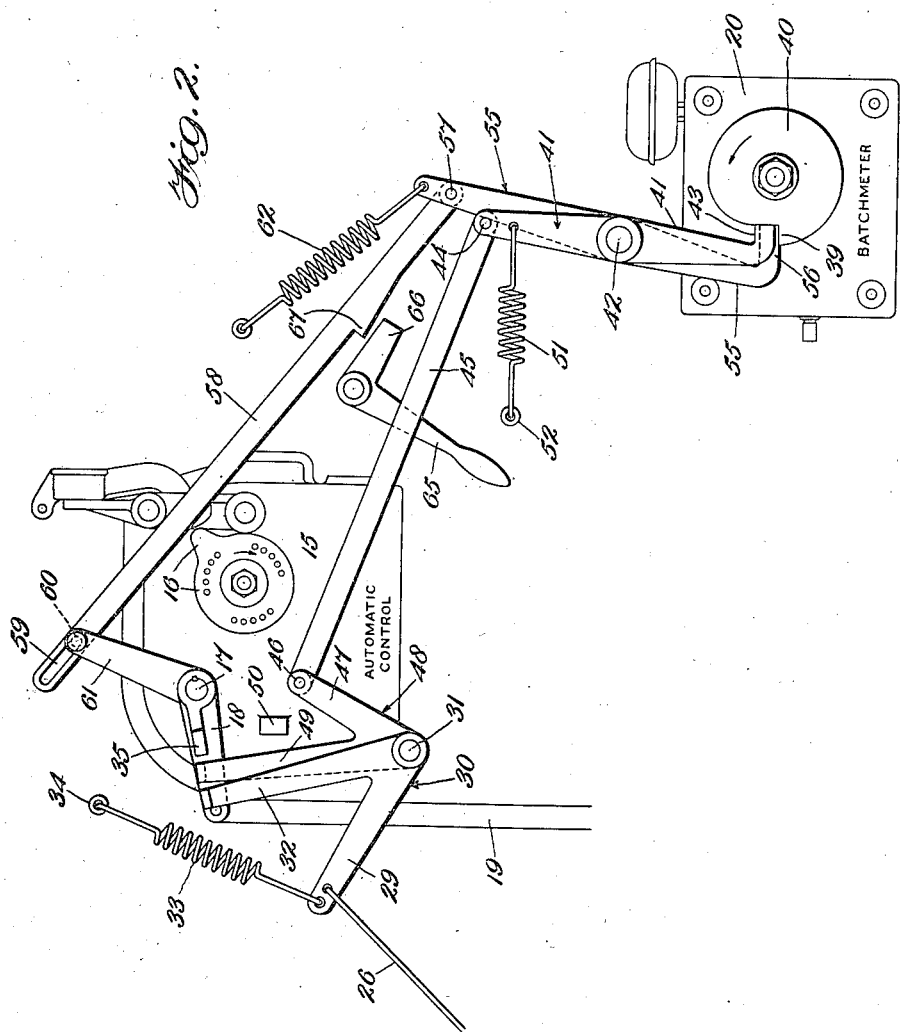

Inventors
*Arthur E. Miller* and
*Samuel Shafer, Jr.*
By *Barker & Collings*
Attorneys

Fig. 4.

Operation Cycle.
(Batchmeter Setting, 60 sec.)

| Seconds | Event |
|---|---|
| 0 | A.C. started; Dis. Chute starts in. |
|  | Dis. Chute in; Discharge begins. |
| 5 | Skip starts up. |
| 10 | Water Valve Opened. |
|  | Discharge Completed; Chute starts out. |
|  | Dis. Chute out; Water begins to enter drum; Material from skip starts in. |
| 15 | Skip reaches top and stops. |
| 20 | Water Valve closed; Skip starts down; Batchmeter started. |
|  | Water all in drum. |
| 25 | Skip reaches ground. |
| 30 | Auto. Cont. stops; Batchmeter locks A.C.; Truck backs in, also locking Auto. Cont. |
| 75 | Truck moves out, unlocking Auto. Cont. |
| 60 | Batchmeter unlocks Auto. Control. Batchmeter stops, starting A.C. |

Inventors
Arthur E. Miller and
Samuel Shafer, Jr.,
By Barker & Collings
Attorneys Patented Jan. 28, 1936

2,028,988

UNITED STATES PATENT OFFICE 2,028,988

CONTROL MECHANISM FOR CONCRETE MIXERS AND ANALOGOUS APPARATUS

Arthur E. Miller and Samuel Shafer, Jr., Milwaukee, Wis., assignors to Chain Belt Company, Milwaukee, Wis., a corporation of Wisconsin Application October 30, 1931, Serial No. 572,161

19 Claims. (Cl. 83—73)

This invention relates to concrete mixers and analogous apparatus and more particularly to automatic mechanism for controlling the operations of the various instrumentalities of such apparatus, and has for one of its objects to supplement and improve the automatic control devices which have been heretofore proposed for this purpose.

In the prior U. S. Patent No. 1,608,831 granted November 30, 1926 to Charles F. Ball, there is disclosed an automatic control mechanism for concrete mixers and similar apparatus, the function of which is to automatically control the sequence and duration of the operations of such instrumentalities of a concrete mixer as the discharge chute, the charging skip, the water supply valve, and the batchmeter or timer. While this device is capable of normally taking care of the proper operation of these various instrumentalities, at the same time provision is also made in accordance with the said Ball patent whereby the operator of the machine may at any time take manual control of one or more of the various instrumentalities, should it for any reason be desirable to temporarily remove such instrumentality from the control of the automatic device.

When such automatic control of the charging skip is employed and even where manual control of such skip is used, either in conjunction with or separate from such automatic control, there exists the danger of the charging skip being elevated to charge a batch of material into the mixing drum before the truck or other vehicle which transports the raw materials from a central yard to the mixer has moved out of its batch-discharging position relative to the skip. As a matter of fact there are instances of record where these skips have been elevated while the truck has been in batch-discharging position with disastrous results to the latter and sometimes injury to the truck operator.

It is one of the primary objects of the present invention to provide means for automatically preventing the elevation of the charging skip, either as the result of the operation of an automatic control device or of the usual manual control mechanism, so long as a vehicle is in discharging position relative to the skip.

It is a further object of the invention to provide means whereby an automatic control mechanism such as that disclosed in the Ball Patent 1,608,831 may be locked to prevent the initiation of a control cycle of such mechanism except when the charging skip is at or relatively close to its batch-receiving position.

A still further object of the invention is to provide means whereby the automatic control mechanism such as that of the Ball patent will be automatically locked by the batchmeter to prevent the initiation of a control cycle, so that the control mechanism may not be started until the batchmeter has completed its timing operation, and the batch within the drum has been completely mixed.

It is a still further object of the invention to provide means whereby the automatic control mechanism may be automatically started upon a new control cycle through the operation of the batchmeter at the conclusion of a timing cycle of the latter, provided the truck or other vehicle has completed its batch-discharging operation into the skip and has moved from its batch-discharging position.

It is a still further object of the invention to provide means whereby the last-named means for starting the automatic control mechanism from the batchmeter may be rendered inoperative or ineffective at will, without preventing the usual manual starting of such automatic control mechanism.

With the above and other objects in view which will appear as the description proceeds, the invention consists in the novel details of construction and combinations of parts more fully hereinafter described and particularly pointed out in the appended claims.

Referring to the accompanying drawings forming a part of this specification in which like reference characters designate like parts in all the views:—

Figure 1 is a diagrammatic side elevational view of a concrete mixing machine of a well known type provided with an automatic control mechanism such as that shown in the Ball Patent 1,608,831 and with a batchmeter or timer of any suitable form, illustrating one form of connections and apparatus constructed in accordance with the present invention for obtaining the above objects;

Figure 2 is an enlarged, elevational view of the various connections and operating instrumentalities associated with the automatic control mechanism and the batchmeter, the parts being shown in the positions they assume in the beginning of a cycle of the automatic control mechanism;

Figure 3 is a view similar to Figure 2 but showing the various parts in the positions they assume subsequent to the close of the cycle of the automatic control mechanism and before the timing cycle of the batchmeter has been completed; and Figure 4 is a chart illustrating graphically a complete operating cycle of a mixing apparatus from the time the automatic control mechanism is started to the time the batchmeter cycle is completed.

Referring more particularly to Figures 1, 2 and 3 the concrete mixing or analogous apparatus 10 is provided with the usual power loader bucket or charging skip 11 which is pivotally mounted as at 12 to the frame-work of the machine and is adapted to be elevated from the full line position shown in Figure 1 to the broken line position shown therein by means of the usual elevating cable 13. The said mixing apparatus is furthermore provided with an automatic control mechanism 15 which is or may be substantially in accordance with the disclosures of the said Ball Patent 1,608,831 and which is adapted through suitable cams such as 16 to control the sequence and duration of the operations of the various instrumentalities of the mixing apparatus, all as is fully set forth in the said patent. The said automatic control mechanism is provided with a shaft 17 carrying a starting lever 18, the outer end of which is connected to a link 19, through which the said control mechanism may be started manually, as described in the said Ball patent. The mixing apparatus is also provided with a batchmeter or timer 20 of any suitable construction and, in accordance with the disclosures of the said Ball patent, such batchmeter is set into operation at a predetermined time during the cycle of the automatic control mechanism and runs for such length of time as may be required to properly mix the drum contents, all in accordance with standard mixing practice.

In order to automatically lock the control mechanism 15 to prevent the initiation of a cycle thereof while a truck or other vehicle is in batch-discharging position relative to the skip 11 the following mechanism is provided: The forward end of the skip has journalled in its side walls as at 21 a U-shaped barrier or trip 22 which is normally maintained in substantially the position shown in Figure 1 by a coiled spring 23, one end of which may be anchored to the skip at 24 and the other end of which engages the arm 25 rigidly connected to the journal 21 of the trip 22. From the said trip 22 a cable or equivalent connection 26 leads rearwardly through suitable guiding pulleys 27 and 28 and has its other end connected to the arm 29 of a bell crank lever 30 pivotally mounted on a stud or shaft 31 and having a second arm 32. A tension spring 33 extending between the arm 29 and a suitable anchor 34 on the framework of the apparatus tends to move the bell crank lever 30 in a clock-wise direction upon its pivot 31 to bring the upper end of the arm 32 beneath the lug or projection 35 formed on the starting lever 18 of the automatic control mechanism, as shown in Figure 3.

When the skip is in its lowest or batch-receiving position illustrated in full lines in Figure 1, and before the truck or other vehicle which transports the raw materials has reached its discharging position relative to the skip, the trip member 22 is in the position shown in Figure 1, under the influence of spring 23, pulling the cable 26 toward the left as viewed in said figure and thereby drawing the bell crank lever 30 toward the left to withdraw its arm 32 from beneath the starting lever lug 35 to the position shown in Figures 1 and 2. On the other hand when a truck or vehicle backs into the skip 11 to discharge a batch of raw material thereinto, the wheel or other portion of the said truck will strike the bar or trip 22, moving the same in a clock-wise direction against the action of spring 23, relieving the tension on cable 26, and permitting spring 33 to move lever 30 in a clock-wise direction to bring its arm 32 beneath the lug 35 of starting lever 18. Obviously with the arm 32 beneath the lug 35, as shown in Figure 3, the downward movement of the starting lever 18 through movement of the link 19 will be prevented, and therefore a cycle of the automatic control mechanism cannot be initiated when a truck has backed into the skip, moved the trip 22 toward the right as viewed in Figure 1, relieved the tension on cable 26, and permitted spring 33 to bring the arm 32 of lever 30 beneath lug 35. It therefore results that so long as the vehicle is in discharging position relative to the skip the latter cannot be raised, since the elevation thereof is under the control of the automatic control mechanism 15, and the starting lever 18 of the latter cannot be moved to starting position so long as arm 32 is beneath its lug 35.

As is fully described in the Ball Patent 1,608,831 it is sometimes desirable, and provision is made in accordance with that device, for the operator to take manual control of the charging skip 11 after the same has been elevated to the broken line position shown in Figure 1. When such manual control over the skip is taken by the operator, it may result that the skip is retained in such elevated position beyond the close of the operating cycle of the automatic control mechanism 15. Under such conditions it is desirable to prevent the initiation of a new cycle of the automatic control mechanism and provision is made therefor in the present apparatus. That is to say, by properly locating the guide pulley 28 relative to the pivot point 12 of the skip, as the latter is raised to its broken line position shown in Figure 1, that portion of the cable 26 between the pulley 28 and its connection with the arm 29 will slacken, as indicated in broken lines in Figure 1, and thus permit the spring 33 to move the bell crank lever 30 towards its locking position shown in Figure 3. Under ordinary circumstances the starting lever 18 of the automatic control mechanism remains in its depressed position shown in Figure 2 until the completion of the control cycle, at which time it is automatically returned to its normal horizontal position shown in Figure 3. When the skip is elevated to the broken line position shown in Figure 1, thus slackening the cable connection 26, as just described, the arm 32 of lever 30 will move in a clockwise direction until it engages against the side face of lug 35 of starting lever 18. If the skip is lowered before the completion of the control cycle of mechanism 15 such lowering will again bring the cable 26 taut and return the arm 32 to its position shown in Figure 2, but if on the other hand, the skip 11 is maintained in elevated position beyond the conclusion of the control cycle of mechanism 15, at such conclusion the starting lever 18 will move upwardly thereupon permitting the upper end of arm 32 to snap beneath the lug 35 in position to prevent the lever 18 from again being depressed until the skip is lowered.

In accordance with the disclosure of the Ball Patent 1,608,831 and in ordinary practice the automatic control mechanism, upon being set in motion through movement of the starting lever 18, runs for a predetermined length of time, usually thirty seconds, during which the mechanism moves the discharge chute in and out of discharging position, elevates and lowers the charging skip, and opens and closes the valve controlling the supply of water to the drum. It may also at a suitable point during its cycle of operation set into motion the batchmeter or timer 20 or in some instances this may be accomplished by trip mechanism associated with the charging skip 11. So far as the operations of the present invention are concerned it is immaterial whether the automatic control mechanism itself directly trips the batchmeter or whether the latter is tripped through the elevation of the skip which in turn is controlled by the mechanism 15. It is sufficient that at some point during the cycle of automatic control by mechanism 15 that the batchmeter be tripped and started to time the mixing period of the contents of the drum.

It is desirable that a new cycle of operation of the automatic control mechanism may not be started so long as there is a batch of material being mixed in the drum and so long as the batchmeter 20 is timing the mixing of such batch. The present invention makes provision for accomplishing this result by providing upon the batchmeter 20 a suitable cam 40 which is rotatable through a complete revolution for each timing cycle of the batchmeter. A lever 41 is pivoted as at 42 upon the framework of the machine and is provided with a toe 43 which bears upon the surface of the cam 40. The upper end of lever 41 has pivotally connected to it as at 44 one end of a link 45, the other end of which is pivotally connected as at 46 to an arm 47 of a bell crank lever 48 which may be pivotally mounted upon the stud or shaft 31. The said bell crank lever 48 is provided with a second arm 49 which extends upwardly and is adapted to be moved from the position shown in Figure 2 to a position against a stop lug 50, directly behind the arm 32 of lever 30 and beneath the lug 35 of starting lever 18, so as to prevent starting movement of such lever in the same manner as does the lever 30. A tension spring 51 anchored as at 52 normally tends to hold the parts in the positions shown in Figure 2 with the arm 49 of lever 48 out of alignment with lug 35. When the batchmeter 20 is set in operation the rotation of its cam 40 in the direction indicated by the arrow will move the toe 43 of lever 41 toward the left as seen in Figure 2 and will consequently move the link 45 and bell crank lever 48 towards the right to the positions shown in Figure 3. The batchmeter 20 is ordinarily set into operation approximately 10 seconds before the completion of the control cycle of the automatic mechanism 15 and therefore the cam 40 is so designed and constructed that it will not produce this movement of the lever 41, link 45 and lever 48 until the completion of the control mechanism cycle, in order that the starting lever 18 of the latter may have returned to its neutral position shown in Figure 3. It would of course be possible to so design and construct the automatic control mechanism 15 as to permit its starting lever 18 to return to neutral position immediately after initiating a control cycle and in such event the delay in moving the link 45 and lever 48 toward the right from the position shown in Figure 2 would not be necessary.

While as above indicated the automatic control mechanism 15 is normally set into operation through the manual movement of its starting lever 18 through a link such as 19, it is desirable that such mechanism may be started upon a new cycle of control immediately upon the completion of the timing cycle of the batchmeter. This may be accomplished in the present instance through the provision of a lever 55 also mounted on the stud or shaft 42 and having a toe 56 engaging the batchmeter cam 40. The upper end of the said lever 55 has connected to it as at 57 one end of a link 58, the other end of which is slotted as at 59 to receive a pin 60 providing a lost motion connection with the lever 61 also rigid with the starting shaft 17 of the automatic control mechanism 15. During the timing cycle of the batchmeter the parts are in the positions shown in Figure 3 with the toe 56 of lever 55 riding on the high portion of the cam 40. At the completion of the timing cycle however the toe 56 drops off of the shoulder 39 of the cam 40 to the low portion of the cam, thereby permitting the tension spring 62 to pull the upper end of lever 55 toward the left, as viewed in Figure 3, and into the position shown in Figure 2. This movement of lever is transmitted through the link 58 and pin 60 to lever 61 carried by the starting shaft 17 and of course has the same effect upon the shaft as has the starting lever 18 of the control mechanism. In other words, it moves the shaft 17 a sufficient distance in a counterclockwise direction, as viewed in Figure 2, to initiate a cycle of operation of the said control mechanism 15.

The toe 43 of lever 41 is preferably arranged slightly in advance of the toe 56 of lever 55 so that the cam 40 will permit the operation of lever 41 slightly in advance of lever 55 whereby the locking arm 49 of bell crank lever 48 may be moved from under the lug 35 before the link 58 is moved toward the left to actuate the starting shaft 17.

The pin and slot connection 59 and 60 between the lever 61 and link 58 is provided in order that manual starting of the cycle of the control mechanism 15 may be had irrespective of the automatic starting provided from the batchmeter. When such manual control of the automatic mechanism 15 is desired, the hand lever 65 is moved from its full line position shown in Figure 3 to its broken line position, thereby swinging its toe 66 upwardly and into the path of a lug or projection 67 formed on the link 58 to prevent movement of the latter. It thus results that the actuating mechanism 55, 58, 61, and 62, whereby the automatic control mechanism is started from the batchmeter, will be rendered inoperative or ineffective, but due to the pin and slot connections 59 and 60 the starting lever 18 may be depressed through the medium of link 19 in the ordinary manner.

As fully disclosed in the Ball Patent 1,608,831 the automatic control mechanism thereof is susceptible of adjustment within certain limits to provide for lengthening and shortening the time, and/or changing the relative positions, of the various operations of the instrumentalities of the mixing apparatus. A typical cycle of operation, from the starting in motion of the automatic control mechanism 15 until the completion of the timing cycle of the batchmeter, is graphically indicated in Figure 4. It has been here assumed that the operating cycle of the control mechanism is 30 seconds, that the batchmeter setting is 60 seconds, and that the batchmeter cycle over-laps that of the automatic control mechanism by 10 seconds, being started 20 seconds after the starting of the automatic control cycle. The running time of the automatic control mechanism is indicated by the line 70, beginning at zero seconds and extending to 30 seconds, while that of the batchmeter is indicated by the line 71, beginning at 20 seconds and extending to 80 seconds. During the operation of the automatic control mechanism the discharge chute is moved in, from zero to two seconds, as indicated by the line 72, the discharge takes place from two seconds to the 10th second, as indicated at 73, whereupon the discharge chute is moved out from the 10th to the 12th second, as indicated by the line 74. The elevation of the charging skip is overlapped with the discharge and begins at say the 4th second and extends to the 15th second, as indicated by line 75, it being held in its elevated position 5 seconds, and then permitted to descend from the 20th to the 25th seconds, as indicated by line 76. The material in the skip starts to slide to the drum before the skip has reached its highest elevation, beginning at approximately the 12th second and continues until the 20th second, as indicated by line 77. The water control valve is turned on at the 9th second, but since it takes approximately three seconds for the water to travel through the piping from the valve to the drum, it does not actually reach the drum until approximately the 12th second. The travel of water through the piping is indicated by the line 78, and its admission into the drum by the line 79, which admission continues until approximately the 23rd second.

The batchmeter having been started at the 20th second of the complete cycle, in accordance with the disclosure of the Ball patent, when the automatic control mechanism stops at the 30th second, the batchmeter cam 40 moves the locking lever arm 49 into position to lock the automatic control mechanism against the initiation of the new cycle thereof. The charging skip 11 having reached the ground at approximately the 25th second of the cycle, the truck or vehicle is backed therein, and through the trip 22, cable 26 and spring 33 moves the locking lever arm 32 into locking position, also locking the automatic control mechanism against the initiation of a new cycle. At approximately the 75th second the vehicle will have completed its discharge of a fresh batch into the skip and will move out of its discharging position, whereupon the trip 22, spring 23, and cable 26 will withdraw the arm 32 from locking position. As it approaches the 79th second the toe 43 of lever 41 will drop off of the shoulder 39 of cam 40, permitting spring 51 to move lever 41, link 45 and locking lever arm 49 toward the left as viewed in Figures 1, 2, and 3, thus also unlocking the starting lever 18; and at the 80th second as the batchmeter completes its timing cycle and stops, the toe 56 of lever 55 will drop off of shoulder 39, and spring 62 will move link 58 and lever 61 toward the left, thus immediately beginning the new control cycle from the mechanism 15.

It is obvious that those skilled in the art may vary the details of construction as well as the precise arrangement of parts without departing from the spirit of the invention, and therefore it is not wished to be limited to the above disclosure except as may be required by the claims.

What is claimed is:

1. In concrete mixing apparatus and the like having a charging skip, and mechanism for automatically controlling the operations of said skip, said mechanism being provided with a starting lever for setting it into operation, the combination of means movable to and from position to prevent actuation of the starting lever of said control mechanism; means adjacent said skip, operable by a vehicle as it reaches and leaves discharging position relative to the skip, for controlling the movements of said first named means; and connections between said first and last named means.

2. In concrete mixing apparatus and the like having a charging skip, and mechanism for automatically controlling the operations of said skip, said mechanism being provided with a starting lever for setting it into operation, the combination of a lever movable to and from position to lock said starting lever against actuation; a trip carried by said skip, operable by a vehicle as it reaches and leaves discharging position relative to the skip to control said locking lever; and connections between said trip and locking lever.

3. In concrete mixing apparatus and the like having a charging skip movable to and from a batch-receiving position, and mechanism for automatically controlling the movements of said skip, said mechanism being provided with starting means for setting it into operation, the combination of a locking lever controlled by said skip for automatically locking said starting means against operation when said skip is materially out of its batch-receiving position.

4. In concrete mixing apparatus and the like having a charging skip movable to and from a batch-receiving position, and mechanism for automatically controlling the movements of said skip, said mechanism being provided with a starting lever for setting it into operation, the combination of means movable to and from position to prevent operation of said starting lever; and connections between said means and skip whereby said means may be moved toward said preventive position when said skip is moved materially out of batch-receiving position.

5. In concrete mixing apparatus and the like having a charging skip movable to and from a batch-receiving position, and mechanism for automatically controlling the movements of said skip, said mechanism being provided with a starting lever for setting it into operation, the combination of a lever movable to and from a position to lock said starting lever against starting movement; connections between said skip and locking lever normally taut when the skip is in batch-receiving position to move said locking lever to unlocking position, said connections adapted to slacken as the skip is moved from batch-receiving position; and means for moving said locking lever to locking position as said connections slacken.

6. In concrete mixing apparatus and the like having mechanism for automatically controlling the sequence and duration of the operations of the various instrumentalities of the apparatus, and a timing device for indicating the mixing period, the combination of connections between said timing device and automatic control mechanism, operable by the timing device to prevent the initiation of a cycle of said automatic control mechanism while said timing device is timing a mixing operation.

7. In concrete mixing apparatus and the like having mechanism for automatically controlling the sequence and duration of the operations of the various instrumentalities of the apparatus, and a timing device for indicating the mixing period, the combination of locking means for said automatic control device; and connections between said locking means and said timing device for preventing the starting of said automatic control mechanism while said timing device is functioning.

8. In concrete mixing apparatus and the like having mechanism for automatically controlling the operations of the various instrumentalities of the apparatus, and a timing device for indicating the mixing period, the cycle of operation of which timing device overlaps that of said automatic control device, the combination of connections between said timing device and automatic control mechanism for preventing the initiation of a cycle of said control device until the cycle of the timing device has been completed.

9. In concrete mixing apparatus and the like having mechanism for automatically controlling the sequence and duration of the operations of the various instrumentalities of the apparatus, and a timing device for indicating the mixing period, the beginning and ending of the cycle of said timing device being respectively subsequent to the beginning and ending of the cycle of said control mechanism, the combination of a locking member for said automatic control mechanism; and connections between said member and timing device, operable by the latter, to cause said member to lock said control mechanism at the close of its cycle to prevent initiation of a new cycle thereof until the completion of the cycle of said timing device.

10. In concrete mixing apparatus and the like having mechanism for automatically controlling the sequence and duration of the operations of the various instrumentalities of the apparatus, and a timing device for indicating the mixing period, the combination of means movable into a locking position relative to said automatic control mechanism; and cam actuated members operable by said timing device for moving said locking means into locking position to prevent the starting of a control mechanism cycle before the completion of a timing device cycle.

11. In concrete mixing and analogous apparatus having a charging skip, mechanism for automatically controlling the operations of the various instrumentalities of the apparatus, and a timing device for indicating the mixing period, the combination of means controlled by said timing device for starting a cycle of said automatic control mechanism; and means carried by the skip and arranged to be actuated by a vehicle as it moves to and from the skip, for automatically preventing such starting when said vehicle is in discharging position relative to said skip.

12. In concrete mixing apparatus and the like, the combination of a mixing receptacle; a movable skip for charging material into said receptacle; a cycle-control mechanism governing the movements of said skip to and from receptacle-charging position; and a vehicle-operated trip controlling said cycle-control mechanism, to positively prevent said mechanism from initiating a movement of said skip toward receptacle-charging position while the vehicle is in skip-charging position.

13. In concrete mixing apparatus and the like, the combination of a mixing receptacle; a movable skip for charging materials into said receptacle; an automatic cycle-control mechanism governing the movements of said skip to and from receptacle-charging position; a member movable to a position in which it may positively prevent operation of said cycle-control mechanism; and a trip connected to said member, operable by a vehicle as it reaches skip-charging position to cause said member to assume said operation-preventing position, whereby movement of the skip toward receptacle-charging position may be prevented while the vehicle is in such position.

14. In concrete mixing apparatus and the like, the combination of a mixing receptacle; a movable skip for charging materials into said receptacle; an automatic cycle-control mechanism governing the movements of said skip to and from receptacle-charging position; a locking lever arranged to positively prevent operation of said cycle-control mechanism; and a trip connected to said locking lever, engageable by a vehicle as it reaches a skip-charging position, to cause said lever to move to locking position, whereby operation of said cycle-control mechanism and consequent movement of the skip toward receptacle-charging position may be prevented while the vehicle is in trip-engaging position.

15. In concrete mixing apparatus and the like, a mixing receptacle; a movable skip for charging materials into said receptacle; an automatic cycle-control mechanism governing the movements of said skip to and from receptacle-charging position; a locking lever arranged to positively prevent operation of said cycle-control mechanism; means urging said lever toward locking position; a trip connected to said lever; and means connected to said trip, acting in opposition to and normally overcoming said first named means to maintain said lever out of locking position, said trip being movable by a vehicle as it reaches skip-charging position to overcome said last named means, whereby said first named means may move said lever to locking position and thereby prevent operation of said cycle-control mechanism and consequent movement of the skip toward receptacle-charging position while the vehicle is in trip-engaging position.

16. In a concrete mixer and the like having a charging skip, and hoisting apparatus for said skip, the combination of a member mounted on said skip, arranged for actuation by a vehicle as it moves into a discharging position relative to the skip; and connections actuated by said member to control said hoisting apparatus to prevent operation of the latter when the vehicle is in said discharging position.

17. In concrete mixing apparatus and the like having a charging skip, and mechanism for controlling the operations of said skip, the combination of a member mounted at the entrance of said skip for actuation by a vehicle as it moves into discharging position at said skip entrance; and means actuated by said member arranged to prevent said control mechanism initiating a skip cycle while the vehicle is in said discharging position.

18. In concrete mixing apparatus and the like having a charging skip, mechanism for elevating said skip, and control means for said elevating mechanism, the combination of a member carried by the skip in position to be actuated by a vehicle as it moves to and from a discharging position relative to said skip; and means actuated by said member arranged to automatically lock said control means, and unlock the same, as the vehicle respectively reaches and leaves said discharging position.

19. In concrete mixing apparatus and the like having a charging skip movable to and from a batch-receiving position, and mechanism for automatically controlling the movements of said skip, the combination therewith of a locking member for said automatic control mechanism, mounted for movement to and from a position in which it prevents said mechanism initiating a cycle of skip movements; means for moving said locking member to its said position; and connections between said member and skip, arranged through movement of said skip to batch-receiving position to move said member from its said locking position.

ARTHUR E. MILLER.
SAMUEL SHAFER, Jr.